United States Patent [19]

Hunter et al.

[11] Patent Number: 5,346,436
[45] Date of Patent: Sep. 13, 1994

[54] AIR VENT FOR HYDRAULIC CHAIN TENSIONER

[75] Inventors: Francis J. Hunter, Sterling Heights, Mich.; Mark M. Wigsten, Lansing; Sam A. Kuznets, Burdett, both of N.Y.

[73] Assignee: Borg-Warner Automotive, Inc., Sterling Heights, Mich.

[21] Appl. No.: 126,464

[22] Filed: Sep. 23, 1993

[51] Int. Cl.⁵ .............................................. F16H 7/08
[52] U.S. Cl. .................................................... 474/110
[58] Field of Search ........................ 474/101, 109–111, 474/113–117, 133–138

[56] References Cited

U.S. PATENT DOCUMENTS

| | | |
|---|---|---|
| 3,574,418 | 4/1971 | Okabe . |
| 3,626,776 | 12/1971 | Staudinger et al. . |
| 3,812,733 | 5/1974 | Yoshida . |
| 3,960,026 | 6/1976 | Hibino . |
| 3,964,331 | 6/1976 | Oldfield . |
| 4,190,025 | 2/1980 | Wahl . |
| 4,504,251 | 3/1985 | Mittermeier . |
| 4,708,696 | 11/1987 | Kimura et al. . |
| 4,790,796 | 12/1988 | Okabe et al. . |
| 4,826,470 | 5/1989 | Breon et al. . |
| 4,874,352 | 10/1989 | Suzuki . |
| 4,881,927 | 11/1989 | Suzuki . |
| 4,902,266 | 2/1990 | Ojima et al. . |
| 4,909,777 | 3/1990 | Inoue et al. . |
| 4,911,679 | 3/1990 | Inoue et al. . |
| 4,940,447 | 7/1990 | Kawashima et al. . |
| 4,950,209 | 8/1990 | Kawashima et al. . |
| 4,959,041 | 9/1990 | Ojima et al. . |
| 4,963,121 | 10/1990 | Himura et al. . |
| 4,986,796 | 1/1991 | Kawashima et al. . |
| 4,995,854 | 2/1991 | Ojima . |
| 5,030,169 | 7/1991 | Kiso et al. . |
| 5,087,225 | 2/1992 | Futami et al. ................ 474/110 X |
| 5,116,284 | 5/1992 | Cho . |
| 5,234,383 | 8/1993 | Harada et al. . |
| 5,277,664 | 1/1994 | Mott .................................. 474/110 |

FOREIGN PATENT DOCUMENTS 1018211 6/1963 European Pat. Off. .
2065265 6/1981 United Kingdom .

OTHER PUBLICATIONS

Roller Chain as a Transfer Drive for the Automobile; The American Society of Mechanical Engineers, D. N. C. Davies et al., Aug. 18, 1980.

*Primary Examiner*—Thuy M. Bui
*Attorney, Agent, or Firm*—Willian Brinks Hofer Gilson & Lione

[57] ABSTRACT

A hydraulic chain tensioner has an air vent. The tensioner includes a housing having a fluid filled chamber and a hollow plunger slidably received within the chamber and biased in a protruding direction by a spring. The plunger has an upper end with an aperture. The vent includes a disk biased by the spring against the inside of the upper end of the plunger. With the disk having at least one channel formed on at least one side of the disk. The channel has a first end at the periphery of the disk and a second end at a position to establish a connection between the atmosphere and the chamber through the aperture in the upper end of the plunger.

20 Claims, 2 Drawing Sheets

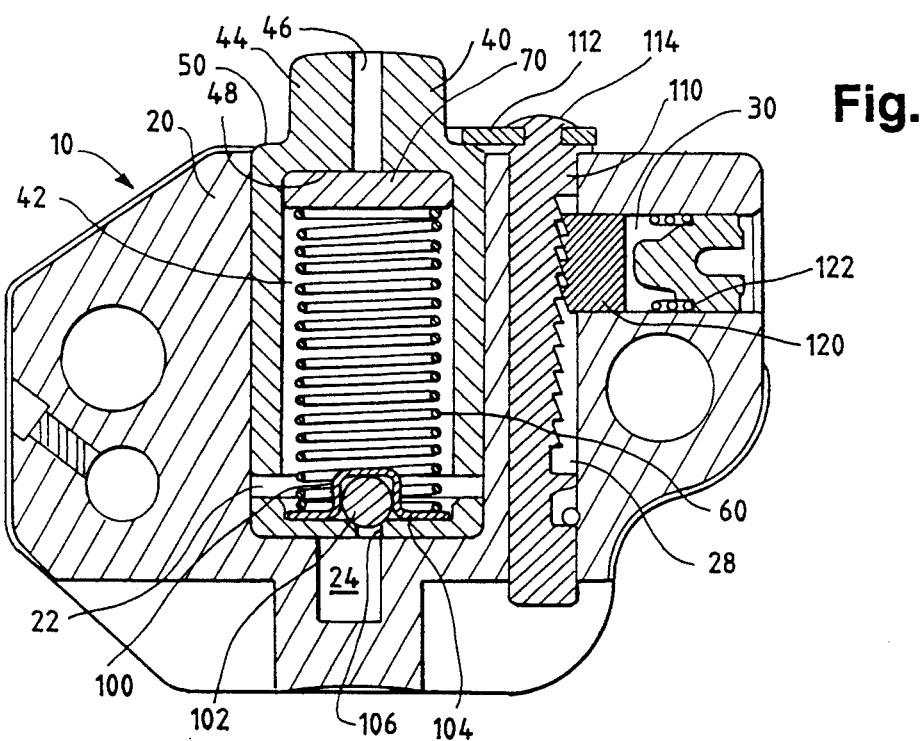
Fig. 1
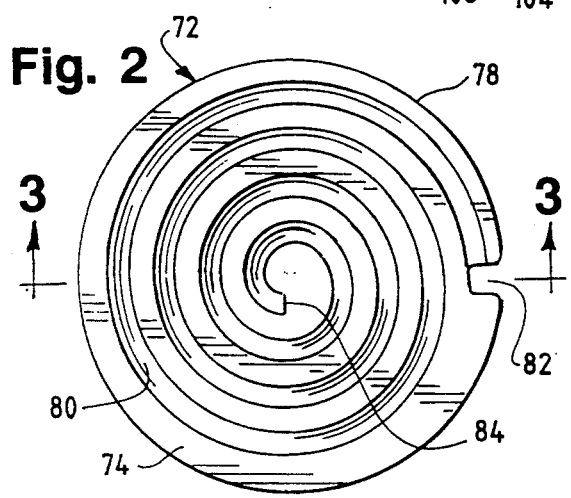
Fig. 2
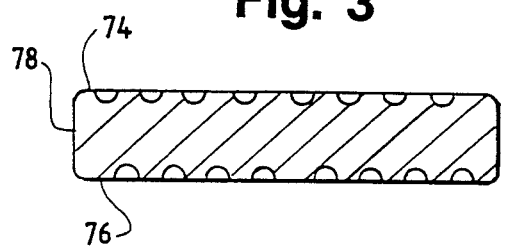
Fig. 3
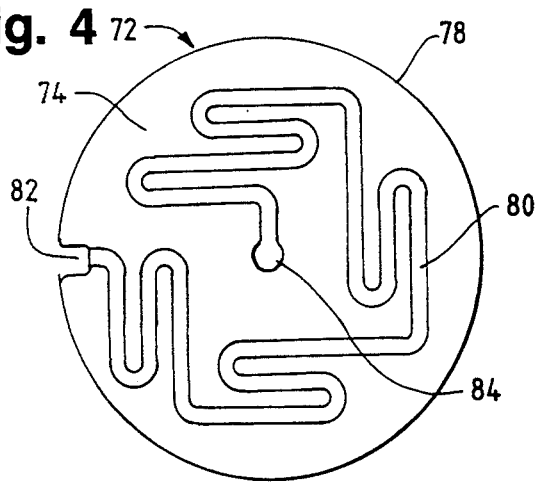
Fig. 4
Fig. 5

AIR VENT FOR HYDRAULIC CHAIN TENSIONER

BACKGROUND OF THE INVENTION

The present invention relates to a hydraulic chain tensioner having a piston longitudinally movable in a housing and more particularly to an air vent for such a hydraulic chain tensioner.

Tensioning devices, such as hydraulic tensioners, are used as a control device for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or un-meshing of the chain teeth. It is especially important in the case of a chain driven camshaft in an internal combustion engine to prevent the chain from slipping because the camshaft timing can be misaligned by several degrees, possibly rendering the engine inoperative or causing damage.

One example of a hydraulic tensioner is described in Kimura et al., U.S. Pat. No. 4,708,696. Kimura et al. disclose a hydraulic ball-type check valve tensioner having a plunger slidably fitted into a chamber and biased outward by a spring to provide tension to the chain. Fluid flows from a reservoir through a clearance formed between the ball and the seat of a check valve. The hydraulic pressure from an external source, such as an oil pump or the like, flows into a chamber through passages formed in the housing easily moving the plunger outward easily by the combined efforts of the hydraulic pressure and the spring force.

When the plunger tends to move in a reverse direction, the ball is tightly contacted with the ball seat to restrict flow of fluid from the chamber. A small clearance between the plunger and the housing wall permits fluid to escape to allow the plunger to retract. In such a fashion the tensioner achieves a so-called no-return function, i.e., movements are easy in one direction (outward) but difficult in the reverse direction (inward).

One drawback to a ball-type check valve is that its response time, i.e., the time to open or close to or from a full flow condition, is somewhat limited. In contrast, a spring check valve, such as that disclosed in Paul Jr., U.S. Pat. No. 3,896,834, provide a more rapid response time than a ball type check valve to open or close to or from a full flow condition.

A potential problem with hydraulic tensioners, however, is that they may not always maintain a predetermined tension, particularly when the engine is idling or at rest with low or no oil pressure. Unless appropriate oil pressure is applied to the chamber or the chamber is filled with sufficient oil, the plunger moves easily in both directions and loses the no-return function.

One solution to this potential problem is to provide a ratchet to act as a mechanical no-return device. For example, Suzuki, U.S. Pat. No. 4,874,352, provides a ratchet on the outer surface of the plunger to ensure the plunger will remain extended outward even upon low oil pressure or against tension from the chain. As another example, Renold, Great Britain Patent No. 1,018,211, provides an internal ratchet having a helical channel.

A problem with each of these types of hydraulic tensioners is that the fluid pressure inside of the hydraulic bore may change due to the introduction of air into the bore. If an excessive amount of air is present on the chamber, the plunger will easily move due to the compressibility of the air. As a result, the proper functioning of the tensioner will not be achieved. It is therefore desirable to provide for venting of air from the hydraulic bore.

One method for venting air is disclosed in U.S. Pat. No. 4,507,103 where a plug having a groove machined onto its flank is pressed into a smooth bore at the top of the piston so that a connection exists between the atmosphere and the fluid reservoir. A drawback to this method is that the plug and groove must be properly machined to fit into the smooth bore and to provide a suitable connection.

The vent of the present invention, on the other hand, is a simple and inexpensive apparatus to provide an air vent for a hydraulic tensioner. The vent is a disc having at least one channel formed on at least one surface to provide a connection between the atmosphere and the fluid reservoir. In this way excess fluid as well as air can be removed from the chamber.

SUMMARY OF THE INVENTION

The present invention is directed to a hydraulic chain tensioner having an air vent. The tensioner includes a housing having a fluid filled chamber and a hollow plunger slidably received within the fluid chamber and biased in a protruding direction by a spring. The plunger has an upper end with an aperture. A vent is provided within the chamber and includes a disk having a first surface, a second surface, and a periphery. Preferably, the disk is integrally molded of plastic which allows the vent to be easily manufactured. At least one channel is formed on at least one surface of the disk. The channel has a first end terminating at the periphery of the disk and a second end terminating in a position to establish a connection between the atmosphere and the chamber through the aperture in the plunger.

Preferably, the disk is biased against the inside of the upper end of the plunger by the spring with the second end of the channel terminating at the approximate center point of the disk so that a connection exists between the atmosphere and the chamber to allow excess oil as well as air to be vented from the chamber. To control the flow of the fluid from the chamber and to restrict or minimize the amount of air entering the chamber, the channel has a circuitous path from the first end to the second end. Preferably, the path of the channel has at least one curve of at least about 90 degrees.

In one embodiment, the vent has a restricting member extending from the same side of the disk as the channel. The restricting member extends into the aperture provided in the upper end of the plunger to further restrict the flow of fluid from the chamber.

In another embodiment, the vent has a lower extension extending from the vent disk on the side opposite the channel to stabilize the location and placement of the vent against the inside of the upper end of the plunger. The lower extension also reduces the volume within the fluid chamber which will speed the filling of the chamber and also reduce the potential volume of air that may need to be purged.

In one preferred embodiment of the tensioner, a passage is provided in the housing to connect the chamber with a source of fluid pressure. A check valve is provided between the chamber and the source of fluid pressure to permit fluid flow into the chamber while blocking flow in the reverse direction. In this preferred embodiment, the check valve may be a ball and spring check valve, a spring valve, or a variable orifice check valve.

In another preferred embodiment, the tensioner includes a rack and ratchet assembly to provide a mechanical no-return function. The rack is associated with the plunger so that the rack moves outward with the plunger. A ratchet is biased by a spring into meshing engagement with the rack to provide a no-return function. More preferably, the tensioner includes the check valve and the rack and ratchet assembly.

BRIEF DESCRIPTION OF THE DRAWINGS

FIG. 1 is a sectional view of a hydraulic tensioner incorporating the air vent of the present invention.

FIG. 2 is a top view of one embodiment of the air vent of the present invention.

FIG. 3 is a sectional view of the air vent of FIG. 2 along line 3—3.

FIG. 4 is a top view of another embodiment of the air vent of the present invention.

FIG. 5 is a top view of another embodiment of the air vent of the present invention.

DETAILED DESCRIPTION OF THE INVENTION AND PREFERRED EMBODIMENTS

Figure 6:
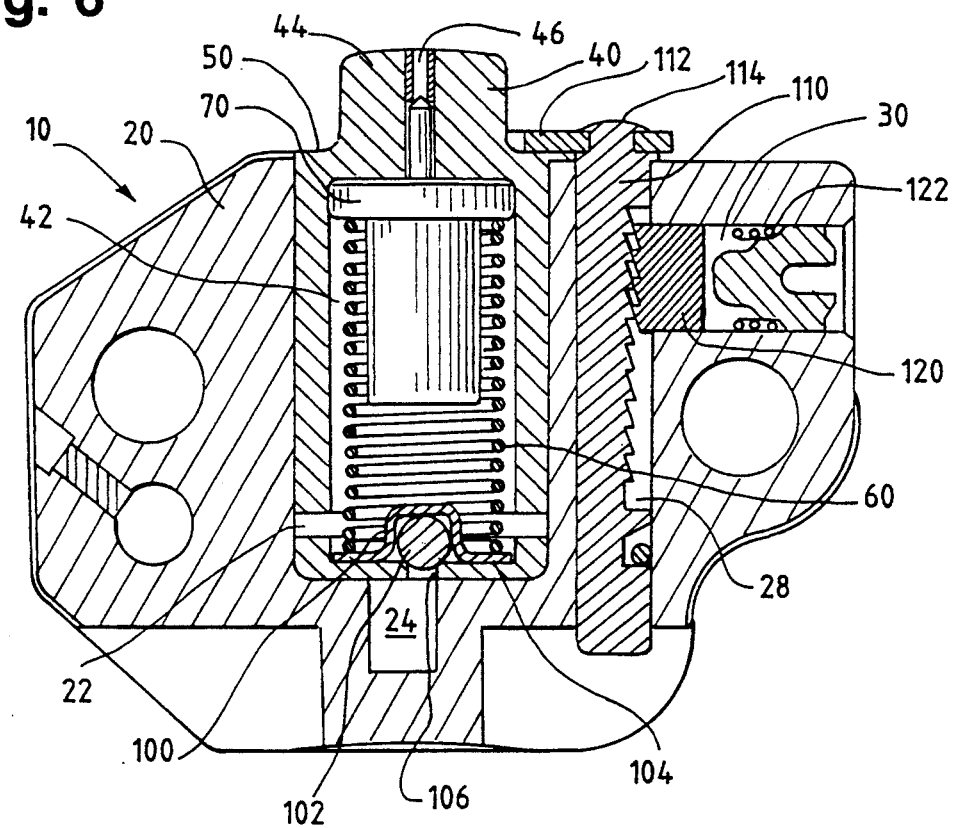
FIG. 6 is a sectional view of a hydraulic tensioner incorporating another embodiment of the air vent of the present invention.

Turning now to the drawings, FIG. 1 illustrates the most preferred embodiment of the hydraulic chain tensioner 10 incorporating the vent of the present invention. The tensioner includes a housing 20 having a chamber 22 filled with fluid through a passageway 24 from a pressure fluid source (not shown). The fluid source may be an oil pump or a reservoir. Preferably, the chamber is cylindrical. The chamber slidably receives a hollow plunger 40, preferably cylindrical, having an interior space 42 and an upper end 44 with an aperture 46. Preferably, the aperture is located in about the center of the upper end. The upper end 44 contacts a lever or arm (not shown) to provide tension along a chain strand. A spring 60 contacts the inside 48 of the upper end of the plunger to bias the plunger in a protruding or outward direction.

In one embodiment, the vent 70 of the present invention includes a disk 72 having a first surface 74, a second surface 76, and an outer periphery 78. The disk 72 is retained in position and biased against the inside of the upper end 48 of the plunger by the spring 60. Preferably, the disk is cylindrical and has an outer diameter slightly smaller than the inner diameter of the plunger so that it will fit within the plunger. At least one surface, preferably the first surface 74, is formed with at least one channel 80 with each having a first end 82 and a second end 84. The first end 82 terminates at the outer periphery 78 of the disk. The second end 84 terminates at a location such that a connection is created between the atmosphere and the chamber through the aperture 46 provided in the upper end of the plunger. Preferably, since the aperture 46 is provided in about the center of the upper end of the plunger, the second end 82 terminates at the approximate center point of the disk.

The channel 80 preferably has a circuitous path from the first end to the second end, as best seen in FIGS. 2, 3, 4, 8, and 9 to minimize the discharge of an excessive amount of fluid from the chamber to the atmosphere and to minimize the ingress of air into the chamber. More, preferably, the channel 80 has at least one curve of at least ninety degrees.

Referring more particularly to FIG. 2, a top view of one embodiment of the vent of the present invention is shown. In this embodiment, the vent is a disk 72 having a single circuitous channel 80 provided on the first surface of the disk 74. The first end of the channel 82 is cut-out from the periphery 78 of the disk. The channel path is in the shape of a spiral that is curved at least ninety degrees and extends from the periphery to the approximate center point of the disk with the second end 84 terminating at about the center point of the disk.

FIG. 4 illustrates another embodiment of the vent of the present invention. The vent is a disk 72 having a single circuitous channel 80 formed on the first surface 74. The channel 80 has several curves of about 180 degrees as well as at least one curve of about 90 degrees. The second end of the channel 84 terminates at about the center point of the disk. FIG. 5 illustrates another embodiment of the vent. The vent is a disk 72 having a single circuitous channel 80 formed on the first surface 74 of the disk. The channel 80 is formed adjacent the periphery 78 of the disk and includes at least one curve of about 90 degrees. The second end of the channel 84 terminates at about the center point of the disk. It will be appreciated by one skilled in the art, that the channel 80 may have any suitable path for controlling the rate of flow to and from the chamber and the atmosphere.

Figure 7:
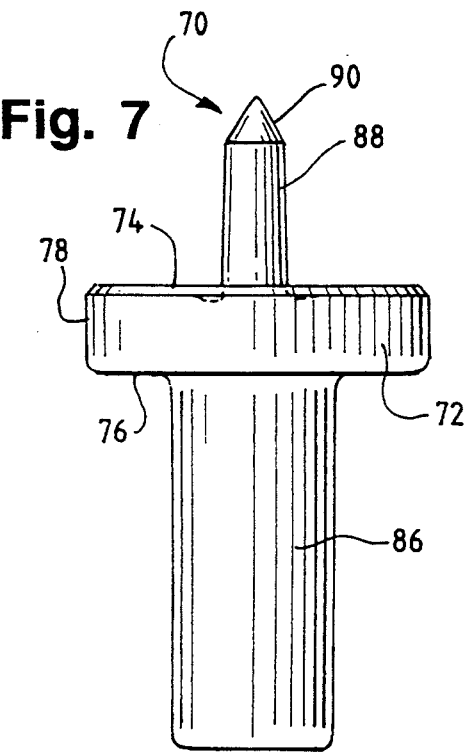
FIG. 7 is a side perspective view of the air vent in FIG. 6.

FIG. 6 shows the hydraulic tensioner of FIG. 1 that incorporates another embodiment of a vent of the present invention, shown more clearly in FIG. 7. In this embodiment, the vent 70 is a disk 72 with a lower extension 86 extending from the second side 76 of the disk into the annulus of the spring 60 to stabilize the disk and to reduce the volume of the chamber which will speed the filling of the chamber with fluid and also reduce the potential volume of air that may need to be purged. The disk 72 preferably has a restricting member 88, preferably having a tip 90, extending from the first side 74 into the aperture 46. The restricting member has an outer diameter slightly smaller than the inner diameter of the aperture. As a result, the restricting member 88 further restricts the flow of fluid through the aperture.

Figure 8:
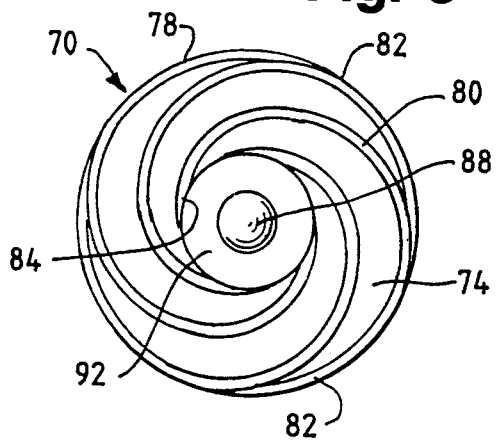
FIG. 8 is a top view of one embodiment of the air vent of FIG. 7.
Figure 9:
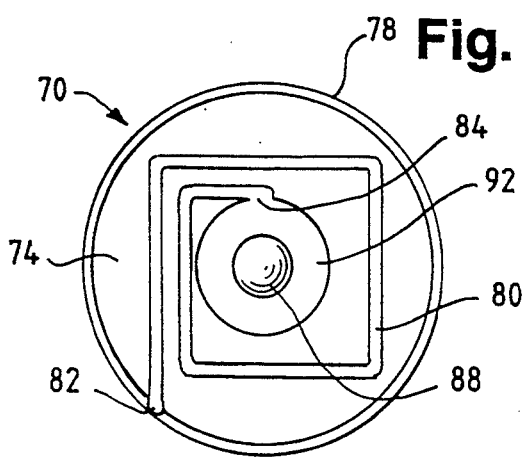
FIG. 9 is a top view of another embodiment of the air vent of FIG, 7.

At least one channel 80 is formed on the first side 74 and each has a first end 82 at the periphery of the disk and a second end 84 terminating at an annulus 92 that surrounds the restricting member 88, best seen in FIGS. 8 and 9. The restricting member 88 is preferably located at about the center point of the disk and is surrounded by the annulus 92. In this way, the fluid can flow from the first ends 82 through the channels 80 to the second ends 84 and into the annulus 92 where the fluid can flow along the restricting member 88 to the tip 90 and through the aperture 46 to the atmosphere.

In one embodiment of a vent of FIG. 7, shown in FIG. 8, the first surface 74 has several channels 80 and a restricting member 88. The channels 80 are semi-spirals and each have a first end 82 at the periphery of the disk 78 and a second end 84 terminating at the annulus. In another embodiment of a vent of FIG. 7, best shown in FIG. 9, the first surface 74 has a single channel 80 and a restricting member 88. The channel includes a square spiral path with at least one curve of at least 90 degrees.

As noted above, the housing 20 is provided with a passageway 24 at the bottom of the chamber 22 to connect the chamber with a source of fluid pressure. The source of fluid pressure may be a reservoir, oil pump, or the like. In one embodiment of the tensioner, a check valve 100 is provided between the chamber and the passageway, and thus the source of fluid pressure, to permit fluid flow into the chamber while blocking fluid flow in the reverse direction. Preferably, the check valve 100 includes a ball 102 and a spring 104 biasing the ball toward a ball seat 106. In another embodiment, the check valve may be a variable orifice check valve as shown and described in U.S. Pat. No. 5,259,820 and U.S. Pat. No. 5,277,664 both of which are owned by the assignee of the present application and both of which are incorporated herein by reference.

In another embodiment, the tensioner includes a rack and ratchet assembly to provide a mechanical no-return function. In this embodiment, the housing 20 is provided with a longitudinal port 28 parallel to the chamber to receive a rack 110 that is outwardly movable within the port 28. The rack 110 is associated with the plunger 40 so that as the plunger moves outward, the rack 110 also moves outward. Preferably, the rack 110 is provided with a flange 112 at its upper end that contacts a shoulder 50 on the upper end of the plunger. The housing 20 also has a lateral cavity 30 in which a ratchet 120 and spring 122 are received. The spring 122 biases the ratchet into meshing arrangement to provide a mechanical no-return function. In the most preferred embodiment, the tensioner includes both the check valve and the rack and ratchet assembly.

In operation, when the plunger is being stressed inward by tightening of the chain, a very hard resistance can be noticed since the plunger is completely filled with an incompressible fluid. In the case of a sufficiently high pressure, overflow fluid flows to the first end of the channel through the channel to the second end and to the atmosphere through the aperture in the upper end of the plunger. Together with this overflow fluid, air is pushed out that, during the operation of the tensioner, may have accumulated in the chamber so that a continuous venting of the chamber occurs.

At the same time, in the most preferred embodiment, where the tensioner includes a rack and ratchet assembly a mechanical no-return function is provided. As the plunger 40 moves outward, the shoulder 50 contacts the flange 112 to carry the rack 110 outward. When the oil pressure decreases and the chain tension forces the plunger inward, the rack 110 remains in its last most outward position due to the ratchet. If the chain tension is sufficiently great so that the top of the plunger extends below the flange 112, the chain tension will be maintained by the top 112 of the rack which will not move inward due to the cooperation of the rack and ratchet. Even when the fluid pressure is low or does not exist, the no-return function is retained by operation of the rack and ratchet assembly.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:
   a. a housing having a fluid filled chamber;
   b. a hollow plunger slidably received within the fluid chamber and having an upper end, the upper end having an aperture;
   c. a spring biasing the plunger in a protruding direction; and,
   d. a vent including a disk having a first surface, a second surface, and a periphery and at least one channel formed on at least one surface of the disk, the channel having a first end terminating at the periphery of the disk and a second end terminating in a position to establish a connection between the atmosphere and the chamber through the aperture.

2. The chain tensioner of claim 1 wherein the disk is biased by the spring against the inside of the upper end of the plunger.

3. The chain tensioner of claim 2 wherein the second end terminates near the center point of the disk.

4. The chain tensioner of claim 1 wherein the channel has a circuitous path from the first end to the second end.

5. The chain tensioner of claim 4 wherein the channel path further has at least one curve of at least 90 degrees.

6. The chain tensioner of claim 1 further having a restricting member extending from the same surface of the disk where the channel is formed.

7. The chain tensioner of claim 6 wherein the restricting member extends into the aperture.

8. The chain tensioner of claim 7 wherein an annulus is formed on the surface of the disk and surrounds the restricting member with the second end of the channel terminating at the annulus.

9. The chain tensioner of claim 1 further having a passage in the housing to connect the chamber with a source of fluid pressure.

10. The chain tensioner of claim 9 further having a check valve provided between the chamber and the source of fluid pressure to permit fluid flow into the chamber while blocking flow in the reverse direction.

11. The chain tensioner of claim 1 further having
   a. a movable rack associated with the plunger; and,
   b. a ratchet biased by a spring in meshing engagement with the rack.

12. A hydraulic chain tensioner comprising:
   a. a housing having a fluid filled chamber, a passage in the housing to connect the chamber with a source of fluid pressure, and a check valve provided between the chamber and the source of fluid pressure to permit fluid flow into the chamber while blocking flow in the reverse direction;
   b. a hollow plunger slidably received within the fluid chamber and having an upper end, the upper end having an aperture;
   c. a spring biasing the plunger in a protruding direction; and,
   d. a vent including a disk having a first surface, a second surface, and a periphery and at least one channel formed on at least one surface of the disk, the disk being biased by the spring against the inside of the upper end of the plunger, the channel having a first end terminating at the periphery of the disk and a second end terminating in a position to establish a connection between the atmosphere and the chamber through the aperture.

13. The chain tensioner of claim 12 wherein the second end terminates near the center point of the disk.

14. The chain tensioner of claim 13 wherein the channel has a circuitous path from the first end to the second end.

15. The chain tensioner of claim 14 wherein the channel path further has at least one curve of at least 90 degrees.

16. The chain tensioner of claim 12 further having a restricting member extending from the same surface of the disk where the channel is formed, the restricting member extending into the aperture.

17. The chain tensioner of claim 16 wherein an annulus is formed on the surface of the disk and surrounds the restricting member with the second end of the channel terminating at the annulus.

18. The chain tensioner of claim 12 further having
a. a movable rack associated with the plunger; and,
b. a ratchet biased by a spring in meshing engagement with the rack.

19. A hydraulic chain tensioner comprising:
a. a housing having a fluid filled chamber, a passage in the housing to connect the chamber with a source of fluid pressure, and a check valve provided between the chamber and the source of fluid pressure to permit fluid flow into the chamber while blocking flow in the reverse direction;
b. a hollow plunger slidably received within the fluid chamber and having an upper end, the upper end having an aperture;
c. a spring biasing the plunger in a protruding direction;
d. a vent including a disk having a first surface, a second surface, and a periphery and at least one channel formed on at least one surface of the disk, the disk being biased by the spring against the inside of the upper end of the plunger, the channel having a first end terminating at the periphery of the disk and a second end terminating in a position to establish a connection between the atmosphere and the chamber through the aperture;
e. a movable rack associated with the plunger; and,
f. a ratchet biased by a spring in meshing engagement with the rack.

20. The chain tensioner of claim 19 further having
a. a restricting member extending from the same surface of the disk where the channel is formed, the restricting member extending into the aperture; and,
b. an annulus formed on the surface of the disk and surrounding the restricting member with the second end of the channel terminating at the annulus.

* * * * *